May 9, 1961 S. SAMUEL 2,983,828

SWITCHING CIRCUITS

Filed Dec. 30, 1958 4 Sheets-Sheet 1

May 9, 1961 S. SAMUEL 2,983,828

SWITCHING CIRCUITS

Filed Dec. 30, 1958 4 Sheets-Sheet 3

May 9, 1961 S. SAMUEL 2,983,828

SWITCHING CIRCUITS

Filed Dec. 30, 1958 4 Sheets-Sheet 4

United States Patent Office 2,983,828
Patented May 9, 1961

2,983,828

SWITCHING CIRCUITS

Sergiu Samuel, Paris, France, assignor to Compagnie des Machines Bull (Societe Anonyme), Paris, France Filed Dec. 30, 1958, Ser. No. 783,970
Claims priority, application France Apr. 4, 1958
17 Claims. (Cl. 307—88)

Figure 1:
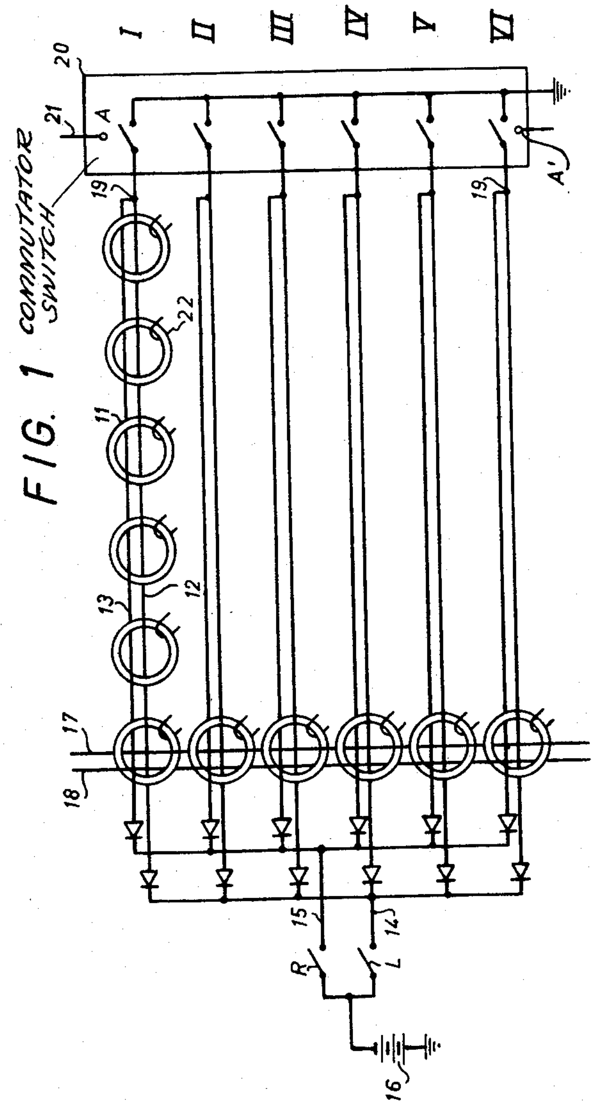

This invention relates to switching circuits for use in apparatus for the processing and storage of information, electronic computers and similar arrangements.

Such switching circuits, which derive from a common type, frequently take the form of a cyclic commutator when it is a question of sequentially energising a number of lines for the selection of utilisation members. The same type of switching circuit may also be employed as a pulse counter having a common input, or may be modified in a number of minor respects to act as a shift register.

In its essential application, the present invention provides the possibility of constructing a cyclic commutator for the sequential selection of the lines or columns of a storage device in the form of a matrix of magnetic elements. It is known that the saturable magnetic cores now available require fairly intense magnetising currents in order finally to obtain an extremely short time of access for the storage device of which they form a part. It follows that the commutator switch must supply a current of relatively high value to the selecting windings of the matrix in the course of cycles of the order of several microseconds.

Many forms of switching circuits comprising electron tubes are known, but they require high feed voltages and powers, and attempts have been made to replace them by switches composed of transistors, which are in addition more advantageous in regard to their useful life and overall dimensions. Various types of switching circuits are therefore known, in which each stage is composed essentially of a bistable flip-flop circuit comprising one or two transistors. In the majority of attempts heretofore made on this principle, a satisfactory ratio between the useful power cyclically supplied to the selected members and the power necessary for the selective actuation and for the continuous feed has rarely been obtained. Moreover, it has not been found possible to construct in a simple and economic manner a switching circuit comprising transistors and capable of operating effectively and at will in a direct switching sense or in the inverse sense.

In the known switching circuits, it is frequently the case that each stage comprises a delay or temporary storage element, generally in the form of at least one capacitor, but these circuits must generally operate at a clearly determined switching rate or at least at a switching rate differing only slightly therefrom. In contradistinction thereto, the switching circuit according to the invention, which does not comprise any delay element, can operate effectively over a very wide frequency range. Once it has been designed to operate reliably and effectively at a maximum switching frequency, its structure has not to be modified in any respect in order to operate at a much lower frequency, or even arrhythmically.

Switching circuits are also known in which the successive stages consist essentially of a plurality of magnetic elements having a saturable core. These circuits are subject to a number of limitations. In the first place, they require separate control members in the form of electron tubes or transistors by means of which they must be fed and actuated. Is addition, these control members must generally supply to them two staggered series of stepping pulses, which necessitates two synchronised pulse generators or additional gating members.

According to an important aspect of the invention the new switching circuit is not subject to the aforesaid limitations, mainly because each of its stages consists of a bistable flip-flop or trigger circuit comprising transistors and associated with a saturable-core magnetic element. In the cyclic switch according to the invention, the cooperation of a magnetic element and of the associated flip-flop is such that it is the current selectively controlled by one of the transistors of this flip-flop which serves to change the magnetic element from a first state of saturation to a second, opposite state of saturation, the switch then only requiring a single series of stepping pulses. These pulses are applied only to a control winding extending throughout all the magnetic elements, the arrangement adopted being such that no direct connection exists between the windings of any stages, whether adjacent or not, apart from the said control winding.

The original combination of a bistable transistor flip-flop and of a saturable-core magnetic element in each stage of a switching circuit has made it possible to combine in the latter a series of advantageous features which may be summarised as: high rapidity of operation, simple and economic construction, high ratio between the selectively controlled useful power and the total feed power, possibility of obtaining switching in the direct sense or in the inverse sense by simple means and with the aid of a single series of stepping pulses.

The invention also permits of constructing a switching circuit which is not limited to rhythmic operation but which can, on the contrary, afford a possibility of static control. By this is meant that, provided that the series of stepping pulses is suspended, the same stage can repeatedly perform its selecting function without the state of the switching circuit being disturbed, which was not possible heretofore with switching circuits comprising magnetic elements.

The same possibility is afforded in the variants arranged to operate as pulse counters and as a shift register in which the positioning of the information can be interrogated or manifested as many times as is desired without any change in the state of the apparatus.

Figure 2:
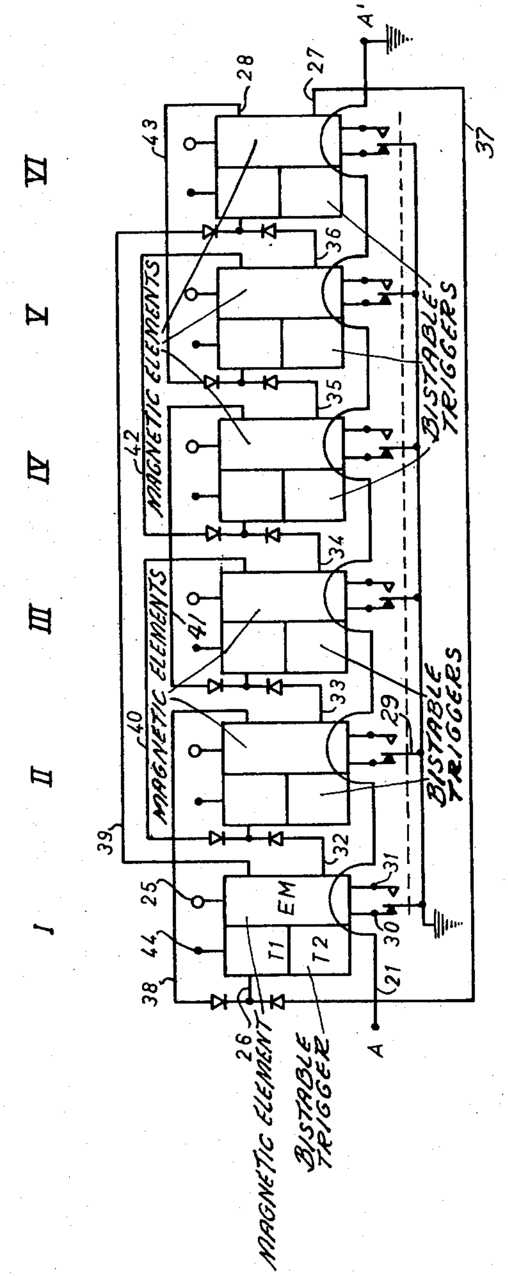
Figure 3:
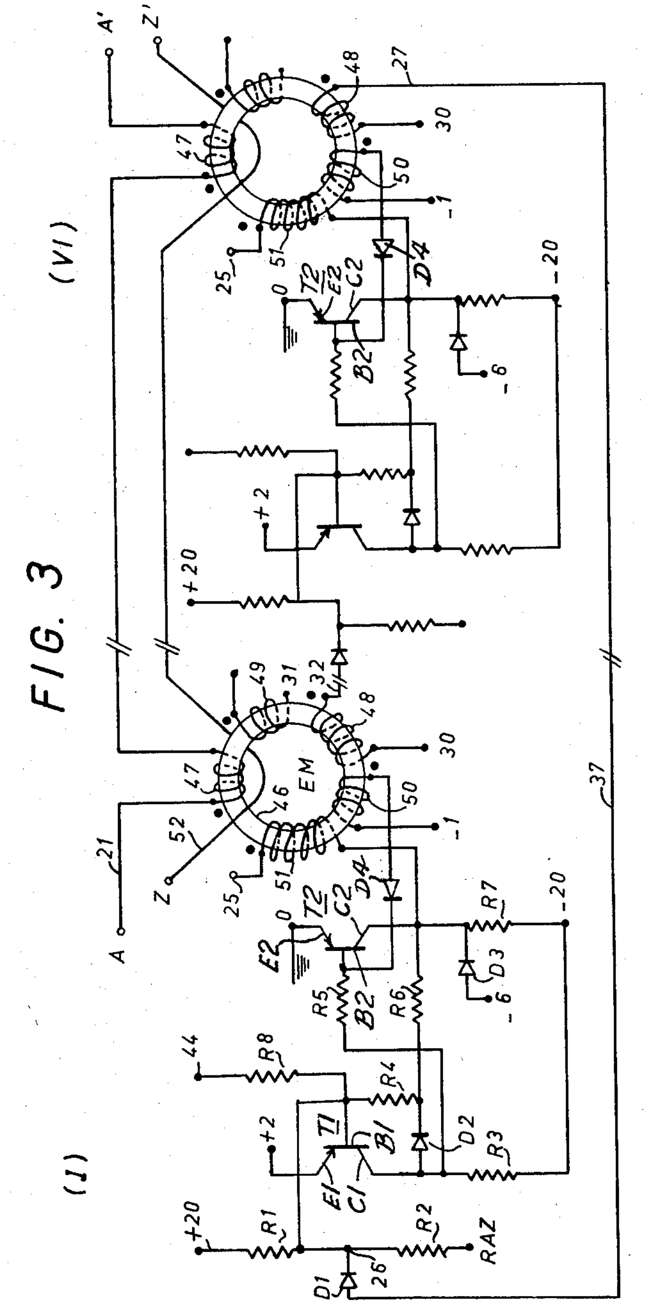
Figure 4:
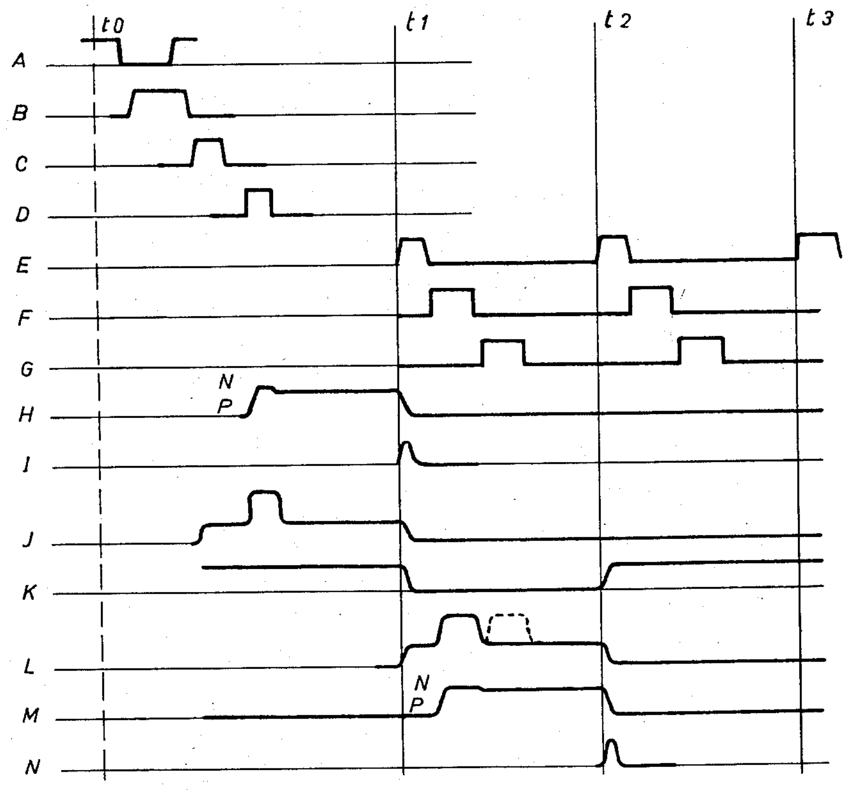
Figure 5:
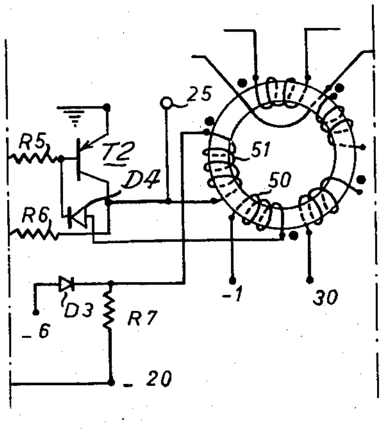

For a better understanding of the invention and to show how it may be carried into effect, an embodiment thereof will now be described, by way of example, with reference to the accompanying drawings, in which:

Figure 1 is a basic circuit diagram of a storage matrix controlled by a cyclic commutator according to the invention, Figure 2 is a functional diagram of the said commutator, Figure 3 is a diagram of the electric circuits of the commutator, Figure 4 is a diagram of the waveforms obtainable during operation, and Figure 5 illustrates a modification applicable to the circuits of Figure 3.

Figure 1 provides an example of the application of the invention to the cyclic selection of the storage positions of a matrix of saturable magnetic cores. The matrix is composed of a number of magnetic cores 11, the arrangement of which is illustrated in the form of rows or horizontal lines and vertical columns. In the illustrated example, there are six lines and six columns but it will be appreciated that this number, which is chosen as six for the purpose of the description, may in practice be smaller or larger, depending upon the applications envisaged. For simplification of the drawings, only the upper line and the left-hand column of the cores have been shown. Each line of cores has extending therethrough a readout-selecting winding 12 and a registering-selecting winding 13. Only one conductor is illustrated in Figure 1, but it will be understood that each winding may comprise a plurality of coils having a plurality of turns wound on each of the cores through which it passes. It will likewise be seen that the windings 12 and 13 extend through each core in opposite directions so that when a current flows through the winding 12 the latter produces in each core a magnetic flux of negative direction, for example, while when a current flows in the same direction through the winding 13 the latter produces in each core a magnetic flux of opposite direction, and therefore positive, for example.

The windings 12 are combined and connected by a common conductor 14 to a switching member L. The windings 13 are combined and connected by a common conductor 15 to a switching member R. The members L and R are symbolically illustrated as open contacts, but they are in fact electronic switching devices operating cyclically and selectively to close a circuit for a predetermined very short time. The junction point of the members L and R is connected to a direct-current source 16, the positive pole of which is connected to earth. Each column of magnetic cores has extending therethrough a readout-selecting winding 17 and a registering-selecting winding 18. The cyclic selection for the operation of each of the cores is obtained, in the manner which is now well known, by the coincidence of magnetising currents in the selecting windings of the line and of the column corresponding to this core.

The switching member L, which determines the selection for reading, closes in the course of each of the successive minor cycles, while the closing of the switching member R, which determines the selection for registering, is conditioned by one or more devices in dependence upon the binary element of information 1 or 0 to be registered. The pulses supplied by the said device or devices may emanate from a magnetic scanning head or from a reading circuit of another information storing device.

The readout-selecting windings 12 and the registering-selecting windings 13 have on the right for each line of the matrix a common point, such as 19, which is connected to a corresponding stage of the commutator 20, which is the main subject of the invention. Each of its stages I to VI is symbolically represented by a switch contact, but the true circuit arrangements will hereinafter be described in greater detail. A conductor 21 permits of applying the train of stepping pulses to the terminals A—A'. It is sufficient for the moment to consider that each of the successive pulses has the effect of sequentially closing the contacts of the stages I to VI one after the other, thus effecting the cyclic selection of the various lines of the matrix, each in the course of one pulse period or minor cycle.

Since the arrangement for the cyclic selection of the columns is identical to that for the selection of the lines, it has not been illustrated in Figure 1. The rate of operation of the column selecting switch must be slower than that of the line selecting switch, that is to say, in the example under consideration, a column pulse period is six times as long as a line pulse period.

Each magnetic core also comprises a reading output coil 22, and all such coils may be connected in series to form a single reading output winding which supplies, in the cyclic selection of the lines and of the columns, a pulse train representing the items of information which were stored in the matrix.

The selecting commutator may be examined from its functional aspect with reference to Figure 2. This arrangement comprises six stages I to VI, each of which is composed of a bistable flip-flop circuit comprising two transistors T1 and T2 and a magnetic element EM. The latter is in fact composed of a magnetic core on which are wound a plurality of coils. Some of these coils form a series-connected winding 21, to which the stepping pulses are applied. Each stage comprises a control output terminal 25, which is in fact connected to one of the corresponding junction points 19, as illustrated in Figure 1. Each stage is provided with an input terminal such as 26, a "forward" transfer output terminal such as 27, and a "backward" transfer output terminal such as 28. The input terminal 26 of each stage is connected on the one hand to the "forward" transfer output terminal of the preceding stage, and on the other hand to the "backward" transfer output terminal of the succeeding stage, this being effected by means of diode links to prevent any undesirable inter-stage action.

A series of reversing contacts 29 permits of connecting either of the control terminals 30 or 31 of all the stages to earth, so that the switching of the stages can progress in the order of the increasing numbers (forwards) or in the inverse order (backwards), depending upon whether the reversing contacts occupy the position illustrated in Figure 2, or their reverse position. In the first case, the links 32—37 will be the only ones in operation, while in the second only the links 38—43 will be operative. The control of the said contacts may be effected in advance by any appropriate known means.

The flip-flop of each of the stages comprises a special positioning terminal such as 44. By the selective application of a control pulse to the flip-flop of a stage, the latter can be prepared so that a major switching cycle commences with the succeeding stage being rendered operative, in the predetermined order. Normally, a major forward switching cycle commences with the operation of stage I, after preparation of stage VI for operation.

The circuits of the commutator will be examined in greater detail with reference to Figure 3, which illustrates the stages I and VI. The bistable flip-flop circuit of stage I comprises essentially the transistors T1 and T2. Each transistor is of the p-n-p-type and comprises a so-called "emitter" electrode E, a so-called "base" electrode B and a so-called "collector" electrode C. The emitter E1 of the transistor T1 retains a fixed potential of +2 volts by reason of the fact that it is connected to an appropriate direct-voltage source. The emitter E2 of the transistor T2 is constantly at zero voltage by reason of the fact that it is directly connected to earth. Regenerative connections are established, for example, through the resistances R4 and R6 between the base B1 and the collector C2, and through the resistance R5 between the base B2 and the collector C1. The collectors C1 and C2 are connected respectively through the resistances R3 and R7 to a direct voltage source supplying a potential of −20 volts, for example. The base B1 is connected through the resistance R1 to a direct-voltage source supplying a potential of +20 volts, for example. Moreover, the collector C2 is also connected through the limiting diode D3 to a direct-voltage source of potential −6 volts. This arrangement has the effect of preventing the potential of the collector C2 from falling substantially below −6 volts.

The flip-flop illustrated in Figure 3 may occupy one of two stable states of conduction. In the first, called the "inactive" state, the transistor T1 is conductive, but the transistor T2 is non-conductive. Taking into account the values adopted for the various elements and for the feed voltages, it will be seen that the mean potentials in this stage are as follows: +1.5 volts at B1, a slightly lower potential at C1, +1.2 volts at B2 and −6 volts at C2. The diodes D2 and D3 are then conductive. The diode D2 is not strictly essential, but its function, in combination with the low-value resistance R4, is to avoid over-saturation of T1 by preventing the potential C1 from becoming more positive than that of B1. In the opposite state of conduction, called the "active" state, T1 is rendered non-conductive while T2 is conductive. It will be seen that the mean potentials under these conditions are as follows: +2.5 volts at B1, −3.5 volts at C1, −0.3 volt at B2, and a similar potential at C2.

Before a complete switching cycle, all the flip-flops must first be indiscriminately brought to the inactive state. For this purpose, the transistors T1 of all the stages are rendered conductive by the application of a pulse which brings the free end marked RAZ of each resistance R2 to a potential of −20 volts, for example. One of the stages must then be brought selectively to the active state by the application of a pulse to the corresponding base B1 as a result of the momentary connection of the free end of one of the resistances, such as R8, to a potential of +20 volts.

Each of the magnetic elements EM is composed of a saturable magnetic core 46 which may have the form of a tore. The latter consists of magnetic material, the hysteresis loop of which is quasi-rectangular. Each core comprises a stepping coil 47 and a plurality of secondary coils 48, 49, 50, which are wound to produce magnetic fluxes of the same direction as that produced by the coil 47. Another primary coil 51 is wound in such a direction as to produce in the core a magnetic flux of opposite direction to that produced by the coil 47, assuming the inducing currents to be of like direction. The lower ends of the coils 48 and 49 constitute respectively the terminals 30 and 31 hereinbefore mentioned with reference to Figure 2. In Figure 3, only the conductors and diodes connecting the other end of the coil 48 to the input of the flip-flop of the succeeding stage and permitting the forward switching are illustrated. For the sake of clarity of the drawing, the connections to the coils 49 which exist in practice for the backward switching, have not been illustrated. One end of the coil 50 is connected to a fixed potential of −1 volt, while the other end is connected to the base B2 of the associated flip-flop through the diode D4. The latter permits of transmitting to B2 a positive-going pulse, but suppresses any negative-going pulse. The diode D1 performs the same function between the winding similar to 48 of stage VI and the base B1 of stage I. In the development, the type of transistor OC45 proved satisfactory for T1 and T2 and the resistances were given such values that the transistor T2 could supply an appreciable energising power to the selecting winding of the storage matrix.

Operation of the commutator.

Figure 4 shows the wave forms observable in the course of operation. The interval of time elapsing between $t_0$ and $t_1$ constitutes the preparatory phase, and the times $t_1$, $t_2$, $t_3$ denote the beginnings of successive minor switching cycles.

The diagram A represents a negative pulse applied first of all to all the bases B1 of the transistors T1 of all the stages without discrimination. In the case of all the flip-flops which, in the course of the application of voltage to the system, are not already in the inactive state, this negative pulse renders the transistor T1 conductive. The voltage of C1 immediately rises, whereby the base B2 is brought to a potential above that of the emitter E2 through the resistance R5. The conduction of the transistor T2 is thus interrupted. This state is maintained after the end of the said pulse, inter alia by reason of the voltages determined by the voltage divider formed by R1, R4, R6 and R7, taking into account the diode D3. All the trigger circuits are now in the inactive state. A pulse (diagram B) is then applied to the terminals Z—Z′ of the winding 52, which passes through all of the tores 46 in a direction such as to bring them into a state of magnetic saturation in the positive sense. It is merely necessary for the front edge of the pulse B to appear before the end of the pulse A. When the pulse B has ended, the magnetic cores retain a state of remanent magnetisation in the positive sense, called the state P. A positive-going pulse (diagram C) is then applied to the base B1 of the transistor T1 of the stage VI through the corresponding resistance R8. This pulse has the effect of bringing B1 to a more positive potential than E1, which interrupts the conduction of T1. The negative voltage then set up at C1 is transmitted through R5 to the base B2 of T2, whereby the latter is rendered conductive. The collector current of T2 of the stage VI is represented by the diagram J. From this instant, the conditions are such that the flip-flop remains in the active state. The values given to the resistances R5 and R3 permit a considerable base current to flow between earth and the terminal at −20 volts of the voltage source. It can be stated that the base B2 is in a state of saturation, which will if necessary permit the maximum collector current compatible with the rated specifications of the transistor used. In fact, at this instant, the current of the collector C2, which is limited by R7, is only a fraction of the said maximum current. It may be stated that T2 is then in a medium state of conduction.

A momentary closure of the switch L of Figure 1 (diagram D) is then produced. A number of more or less conductive parallel circuits can then close, but the only circuit which can be operative in practice is that controlled by the transistor T2 of the stage VI. This circuit can be traced: from earth (Figure 3), through the space E2—C2 of the transistor T2 (VI), the coil 51, the output control terminal 25, the junction point 19 (Figure 1) of lowest conductor 12, the common conductor 14, the switch L, the current source 16, to earth. During the closure of L, T2 (VI) becomes completely conductive and the surplus current which it feeds through 51 changes the associated tore from the state of remanence P to the state of saturation in the negative sense. When the switch L is again open, the magnetic tore of the stage VI preserves the state of remanent magnetisation N, while T2 returns to the medium conductive state.

A complete switching cycle can then commence at the time $t_1$. This instant corresponds to the application of the first stepping or advancing pulse (diagram E) applied to the terminals A—A′ of the winding 21 (Figure 3) by any appropriate current pulse generator. Each of the coils 47 through which the current of the stepping pulse flows produces a magnetic flux of positive sense, but since only the magnetic tore of the stage VI is in the state N at this instant, the latter is changed over to the state P (diagram H). The reversal of magnetisation produces, on the one hand, a pulse of positive direction (diagram I) at the terminals of the coil 50. This pulse, which is transmitted through D4, renders B2 positive in relation to E2, and T2 (VI) therefore becomes non-conductive (diagram J). Since C2 reaches approximately the potential of −6 volts, the base B1 becomes more negative than E1, and T1 (VI) therefore becomes conductive. The flip-flop of the stage VI has therefore been returned to the inactive state. On the other hand, the same reversal of magnetisation produces a pulse, also of positive direction, across the terminals of the coil 48 (VI), the end 30 of the latter being connected to earth, as previously indicated. This pulse transmitted across 27 and the diode D1 to the base B1 (stage I) of the transistor T1, renders the latter non-conductive (diagram K). The more negative voltage set up at C1 is transmitted, although at reduced value, through R5 to B2. Since the latter becomes negative in relation to E2, T2 reaches a mean conductive state (diagram L) and it is now the flip-flop of the stage I which is maintained in the active state.

At the first closing of the switch L, which occurs shortly afterwards (diagram F), the transistor T2 momentarily becomes completely conductive. The surplus collector current fed through T2 has the effect of changing the tore 46 of the stage I from the state P to the state N (diagram M). Since a further item of information can be registered in a storage element of the matrix immediately after it has been read in the course of the same minor cycle, the switch R (Figure 1) will be closed if the binary digit to be registered is a 1. If the switch R actually closes, a further current surplus may be fed through T2 of the stage I, as illustrated by the broken line of diagram L, which broken line is aligned with the first pulse of the diagram G. Naturally, this second energisation does not reverse the state of the magnetic core 46, which is already in the state N.

At the instant $t_2$, the second stepping pulse has the effect of producing the change of the magnetic core 46 (I) from the state N to the state P. The positive-going pulse (diagram N) which results therefrom causes the return of the flip-flop of the stage I (diagrams K and L) to the inactive state, and the bringing of the flip-flop of the state II to the active state, which is effected by the same processes as have hereinbefore been explained.

The succession of events which has just been detailed thereafter recurs cyclically, each stage becoming operative in turn, as long as the stepping pulses continue to be applied to the commutator.

It will be noted that the commutator is controlled by a single series of stepping pulses (diagram E), since it is the current controlled successively by each stage which produces the reversal of the corresponding magnetic core.

The described arrangement operates correctly up to a recurrence frequency of 300 kc./sec. for the stepping pulses. It is merely sufficient for this purpose that the time shifts of the pulses represented by E, F and G, Figure 4, be maintained at a constant minimum value. When the commutator is to operate at a lower recurrence frequency it is the interval of time between a pulse G and the following stepping pulse which increases accordingly.

There may be indicated by way of example a set of resistance values which have proved satisfactory: R1: 12K (kilohms)—R2: 10K—R3: 2.2K—R4: 390Ω—R5: 470Ω—R6: 2.2K—R7: 1K—R8: 10K. It is possible to add capacitors of low capacitance in parallel with some of the resistances in order to assist in the transmission of the pulse fronts. On the other hand, for each magnetic element EM, the following turns ratios of the coils have proved suitable having regard to the amplitudes of the currents and of the voltages employed: 47: 15 turns—48, 49 and 50: 10 turns—51: 7 turns—52: 1 turn.

A very simple modification of the connection between the coils 51 and the transistors T2 of all the stages permits of utilising the switching circuit either as a selector commutator or as a pulse counter. This modification is shown in Figure 5, in which it will be seen that the coil 51 is now connected in series between the collector of T2 and the resistance R7, the other members not being changed. It will readily be seen that when a stage is in the active state the collector current of T2, which is in a medium state of conductivity, flows through the coil 51 in a direction such as to bring, or to tend to bring, the magnetic core into the state of staturation N. It is to be noted that the number of turns of the coil 51 must be increased because the magnetising current flowing therethrough is of lower value than in the case of the circuit arrangement of Figure 3. The number of turns of the coil 47 must also be increased accordingly.

For operation as a commutator, each of the output terminals 25 is connected to a corresponding junction point 19 of the selection windings of the matrix. The initial positioning of the commutator is effected as previously indicated by the application to the device of the pulses represented by the diagrams A, B and C of Figure 4. However, the previous closing of the switch L (diagram D) is no longer necessary. The complete switching cycle thereafter takes place in the manner previously indicated, but with the difference that the magnetic core of the stage which becomes active is changed from the state P to the state N a little earlier than before, that is to say, as soon as the stepping pulse disappears in the coil 47.

For operation as a counter, the number of stages must obviously be adapted to the chosen counting basis, for example 10 in the case of the decimal system. The pulses to be counted must be applied to the terminals of the stepping winding 21 at regular or irregular intervals of time. The essential requirement is that they be sufficiently separated to be distinguished by the counting device. Each of the output terminals 25 can be connected to a device for indicating the contents of the counter, such as a signalling lamp or other appropriate member.

In order that the modified switching circuit according to Figure 5 may operate as a shift register, it is necessary to omit from each stage the connection between the base B2 and the coil 50, or simply to omit the coil 50 and the diode D4. The initial positioning is effected in the same manner as before by the application of the pulses according to the diagrams A and B of Figure 4. The information to be stored is thereafter introduced into the storage device, in accordance with the parallel system, by the selective application of positive pulses simultaneously to the bases B1 of the appropriate stages, the result of which is to bring these stages into their active state and to change the corresponding magnetic cores from the state P to the state N. The shift register necessitates two series of stepping pulses. The first series is composed of negative pulses commonly applied to all the terminals marked RAZ in Figure 3. The first pulse of the first series must be applied before the first stepping pulse of the second series, which is the same as that applied to the terminals A—A' of the winding 21. The first pulse of the first series has the effect of bringing into their inactive state those flip-flops which were in the active state, the stored information remaining only in the form of the cores in the state N. The first pulse of the second series has the effect of momentarily changing all the cores to the state P, but for those which are previously in the state N a pulse of positive direction is transmitted from 48 to the base B1 of the adjacent stages, the flip-flops of which change to the active state, while their magnetic cores assumes the state N. The stored information has therefore progressed by one stage. Each pair of successive pulses thereafter causes the said information to progress by one stage.

It is to be noted that these two series of pulses are sufficient to obtain the forward shift (towards the right) or the backward shift (towards the left) of the stored information, since the choice of the shifting direction depends, as previously indicated, only upon a previous static control, in this instance the appropriate position of the contacts 29 of Figure 2. The shift register retains the advantageous features already described with reference to the other applications, namely the fact that the state of the storage device can be interrogated or manifested one or more times without destruction of the stored information, this being due primarily to the inherent properties of their transistor flip-flops which can operate in the saturated phase, and secondly to the absence of direct connections between the flip-flops of the neighbouring stages.

Without departing from the scope of the invention, certain modifications, substitutions or omissions could be effected by persons skilled in the art in the circuit arrangements just described. To quote an example, by connecting the ends 30 of the coils 48 to earth and replacing the contacts 29 of Figure 2 by two series of gating circuits comprising diodes for connecting the other ends of these coils to the inputs of adjacent flip-flops, the coil 49 (Figure 3) could be omitted in each magnetic element, while the possibility of forward or backward switching would be retained.

I claim:

1. In a multi-stage commutator switching arrangement, the combination in each stage of a bistable trigger circuit including two transistors, each having emitter, base and collector electrodes, connected to polarization voltage sources and resistive members in such a manner that the trigger circuit may assume either an inoperative state in which only a first transistor is conducting or an operative state in which only the second transistor is conducting; and a magnetic element comprising a magnetic core exhibiting a substantially rectangular hysteresis loop, said core having wound thereon a first primary coil connected to the collector electrode of said second transistor, an advance primary coil, a first secondary coil with a terminal connected to the base electrode of said second transistor, a second secondary coil with a terminal connected to the base electrode of a first transistor in a following stage, and energizing means for feeding said advance primary coil with an advance pulse, the winding senses of said coils being such that an advance pulse switches said magnetic core from a predetermined remanence state to an opposed saturation state and reverses the conduction states of the associated trigger circuit and of the trigger circuit of said following stage.

2. The combination as claimed in claim 1, further comprising a load element which is series-connected to said first primary coil, and switching means operable to close a circuit including said primary coil and load element, said resistive members in the trigger circuit being so dimensioned that a saturated-base effect permits a substantial increase of the collector current through the second transistor in a trigger circuit being in the operative state when said switching means closes said circuit.

3. In a multi-stage counting arrangement, the combination in each stage of a bistable trigger circuit including two transistors, each having emitter, base and collector electrodes, connected to polarization voltage sources and resistive members in such a manner that the trigger circuit may assume either an inoperative state in which only a first transistor is conducting or an operative state in which only the second transistor is conducting; and a magnetic element comprising a magnetic core exhibiting a substanitally rectangular hysteresis loop, said core having wound thereon a first primary coil series-connected into the collector circuit of said second transistor, an advance primary coil, a first secondary coil with a terminal connected to the base electrode of said second transistor, a second secondary coil with a terminal connected to the base electrode of a first transistor in a following next stage, and energizing means for feeding said advance primary coil with advance pulses to be counted, the winding senses of said coils being such that an advance pulse can switch said magnetic core from a predetermined state of remanence to an opposed state of saturation and reverse the conduction states of the associated trigger circuit and of the trigger circuit of said following stage.

4. Commutator switching arrangement comprising a plurality of cascaded stages, each stage having a bistable trigger circuit which includes first and second transistors, each with emitter, base and collector electrodes, connected to voltage sources and resistors in such a manner that the trigger circuit may be placed either in a first state of conduction or in a second contrary state of conduction, and a magnetic element constituted by a saturable magnetic core which may be set into first or second opposed states of magnetic remanence, said core in each stage having wound thereon a first primary coil connected to the collector electrode of said second transistor, an advance primary coil, a first secondary coil with a terminal connected to the base electrode of said second transistor, a second secondary coil having a terminal connected to the base electrode of a first transistor in the next stage in a determined order, and comprising also means for selectively setting one stage in a characteristic condition by placing its trigger circuit in said second state of conduction, an advance winding being formed with said advance primary coils of all of said stages for receiving advancing pulses, the winding senses of said coils being such that each so received advancing pulse causes said second state of conduction to be transferred from the trigger circuit of said one stage to the trigger circuit of the next stage in said determined order.

5. Switching arrangement as claimed in claim 4, wherein in each stage a load element is connected in series-form with said first primary coil, and in multiple to a common switching device operable after such an advancing pulse has been received to close potential parallel circuits through all of said load elements, only that one of said first primary coils in the stage actually in said characteristic condition being energized to reverse the remanence state of the corresponding magnetic core.

6. Switching arrangement as claimed in claim 4, wherein in each stage a load element is connected in series-form with said first primary coil, and in multiple to a common switching device operable after such an advancing pulse has been received to close potential parallel circuits through all of said load elements, only that one of said first primary coils connected to a conducting second transistor being energized to turn its magnetic core from said first state of remanence to said second state of remanence.

7. Switching arrangement as claimed in claim 6, wherein each core in any stage further bears wound thereon a third secondary coil, a terminal of said coil in any given stage being connected to the base electrode of a first transistor in the next stage in an order contrary to said determined order, and with alternative control means adapted to make operative in all of said stages either said second secondary coils or said third secondary coils, prior to the operation of the arrangement.

8. Magnetic counting arrangement comprising a plurality of ring-connected stages, each stage having a bistable trigger circuit which includes first and second transistors, each with emitter, base and collector electrodes, connected to voltage sources and resistors in such a manner that the trigger circuit may be placed either in a first stage of conduction or in a second contrary state of conduction, and a magnetic element constituted by a saturable magnetic core which may be set into first or second opposed states of magnetic remanence, said core in each stage having wound thereon a first primary coil series-connected in the collector circuit of said second transistor, an advance primary coil, a first secondary coil with a terminal connected to the base electrode of said second transistor, a second secondary coil with a terminal connected to the base electrode of a first transistor in the next stage in a determined order, and comprising also means for selectively setting a zero representing stage into a characteristic condition by placing its trigger circuit in said second state of conduction, thereby setting its magnetic core in a second state of magnetic saturation, a winding being formed with said advance primary coils for receiving advancing pluses to be counted, the winding senses of said coils being such that each so received advancing pulse causes said characteristic condition to be transferred from a given stage to the next following stage in said determined order.

9. Counting arrangement as claimed in claim 8, wherein each core in any stage further bears wound thereon a third secondary coil, a terminal of said coil in any given stage being connected to the base electrode of a first transistor in the next stage in an order contrary to said determined order, and with alternative control means adapted to make operative in all of said stages either said second secondary coils for counting up, or said third secondary coils for counting down.

10. Commutator switching arrangement comprising a plurality of cascaded stages, each stage having a bistable trigger circuit which includes first and second transistors, first and second control inputs related to the base electrodes of the respective transistors, with voltage sources and resistive members arranged so that the trigger circuit may be placed either in a first state of conduction or in a second contrary state of conduction, and a magnetic element composed of a magnetic core exhibiting a substantially rectangular hysteresis loop, said core in each stage being in inductive coupling with a first primary coil connected to the collector electrode of the associated second transistor, an advance primary coil, a first secondary coil with a terminal connected to said second control input in the same stage, and a second secondary coil with a terminal connected to the first control input in the next stage in a predetermined direction, and comprising also means for selectively setting a particular stage in a characteristic condition by placing its trigger circuit in said second state of conduction, an advance winding being formed with said advance primary coils of all of said stages for receiving a series of advancing pulses, the flux changes provoked by said coils when energized being such that each so received advancing pulse causes said second state of conduction to be transferred from the trigger circuit of the stage being in said characteristic condition to that of the next stage in said predetermined direction.

11. Switching arrangement as claimed in claim 10, cooperating with a common switch operated after such an advancing pulse has been received, and wherein each of said primary coils is connected in series relationship to a controlled load element which may be energized upon operation of said switch.

12. Switching arrangements as claimed in claim 11, wherein the values of said resistive members are adapted to the characteristics of both transistors in each stage so that the second transistor in any stage at said characteristic condition supplies a relatively high current flow to the connected first primary coil and load element due to a saturated-base effect, upon operation of said common switch.

13. Commutator switching arrangement comprising several ring-connected stages, each stage including a bistable two-transistor trigger circuit with first and second control terminals and arranged to be set into operative or inoperative states of conduction, and a magnetic element composed of a magnetic core capable of being set into either first or second opposed states of magnetic remanence and bearing a first primary coil, an advance primary coil and several secondary coils, and comprising also means for selectively setting the trigger circuit of a given stage into its operative state and for setting the magnetic element core of the same stage into its second state of remanence, energizing means for feeding all of said advance primary coils with advancing pulses, the secondary coils of each of said magnetic elements being so connected to said control terminals of the adjacent trigger circuits that, when an advancing pulse is supplied to said advance coils, the magnetic core of said given stage is turned back to its first state of magnetic saturation with the result that the associated trigger circuit is set back into its inoperative state and that the trigger circuit of the next stage in a predetermined direction is set into its operative state.

14. Switching arrangement as claimed in claim 13, wherein each trigger circuit includes first and second transistors of the same type of conductivity, with the respective base electrodes related to said first and second control terminals, and wherein said secondary coils in a given stage supply induced pulses to the second control terminal of the trigger circuit of the same stage and to the first control terminal of the trigger circuit of the next stage in said predetermined direction when their corresponding core is turned back to its first state of magnetic saturation.

15. Magnetic counting arrangement comprising several ring-connected stages, each stage including a bistable two-transistor trigger circuit with two control terminals and arranged to be set into operative or inoperative states of conduction, and a magnetic element composed of a magnetic core capable of being set into either first or second opposed states of magnetic remanence and bearing a first primary coil, an advance primary coil and several secondary coils, and comprising also means for setting the arrangement to zero count by selectively setting the trigger circuit of a given stage into its operative state and setting the magnetic core of the same stage into its second state of remanence, switching means for feeding all of said advance primary coils with pulses to be counted, the secondary coils of each of said magnetic elements being so connected to said control terminals of the adjacent trigger circuits that, when a pulse to be counted is supplied to said advance coils, the magnetic core of said given stage is turned back to its first state of magnetic saturation, with the result that the associated trigger circuit is set back to its inoperative state and that the trigger circuit of the next stage in a predetermined direction is set into its operative state.

16. Shift register arrangement comprising a plurality of cascaded stages, each stage having a bistable trigger circuit including first and second transistors, polarization voltage sources and resistive members, with a first control element which can drive the trigger circuit into a first state of conduction, a second control element which can drive the trigger circuit into a second or storage state of conduction, and a magnetic element constituted by a saturable magnetic core which may be set into first or second states of magnetic remanence, said core in each stage having wound thereon a first primary coil series-connected in the collector circuit of said second transistor, an advance primary coil and a secondary coil with a terminal connected to the base electrode of a first transistor in the next following stage in a predetermined order, means effective to energize selected ones of said second control elements to store an information pattern by placing in the corresponding stages the trigger circuit in its second state of conduction and the magnetic core in its second state of magnetic saturation, means for applying a first series of pulses to all of said first control elements, each of said pulses being effective to reset the trigger circuits of all stages to their first state of conduction, an advance winding being formed with all of said advance coils for receiving a second series of pulses interspersed with the pulses of said first series, each of said second series of pulses being effective to reverse the magnetic state of the relevant magnetic cores to said first state of magnetic saturation.

17. In a multi-stage shift register, the combination in each stage of a bistable trigger circuit including first and second transistors, with a first control element which may be activated to place the trigger circuit in a first state of conduction, and a second control element which may be activated to place the trigger circuit in a second state of conduction in which only said second transistor is conducting, and of a magnetic element constituted by a magnetic core exhibiting a substantially rectangular hysteresis loop, said core bearing a first primary coil associated with said second transistor in such a manner that the core remains at a second state of magnetic remanence when said second transistor has been conducting, an advance primary coil adapted, when suitably energized, to reverse said core to a first state of magnetic saturation, and a secondary coil having a terminal connected to a first transistor of the next following stage for transmitting an induced pulse to said first transistor when the magnetic state of said core is being reversed, thereby turning the trigger circuit of said following stage to its second state of conduction.

References Cited in the file of this patent

UNITED STATES PATENTS

| | | |
|---|---|---|
| 2,785,236 | Bright | Mar. 12, 1957 |
| 2,851,678 | Crane | Sept. 9, 1958 |
| 2,889,541 | Huss | June 2, 1959 |